United States Patent
Compton et al.

(10) Patent No.: US 7,699,930 B2
(45) Date of Patent: Apr. 20, 2010

(54) APPARATUS AND METHOD FOR FEEDING MATERIALS TO A CEMENT MILL

(75) Inventors: Horace H. Compton, Leeds, AL (US); Nathan A. Fernow, Independence, KS (US); Ajay Joshi, Hoover, AL (US)

(73) Assignee: LaFarge North America, Herndon, VA (US)

( * ) Notice: Subject to any disclaimer, the term of this patent is extended or adjusted under 35 U.S.C. 154(b) by 707 days.

(21) Appl. No.: 11/602,337

(22) Filed: Nov. 21, 2006

(65) Prior Publication Data

US 2008/0115696 A1    May 22, 2008

(51) Int. Cl.
*C04B 7/14*    (2006.01)

(52) U.S. Cl. .................. 106/745; 106/753; 106/789

(58) Field of Classification Search ............. 106/739, 106/745, 753, 789
See application file for complete search history.

(56) References Cited

U.S. PATENT DOCUMENTS

| | | | |
|---|---|---|---|
| 1,627,237 A * | 5/1927 | Harding ..................... 106/715 |
| 1,916,157 A * | 6/1933 | Chappell .................... 106/714 |
| 2,362,060 A | 11/1944 | Etridge et al. |
| 2,815,293 A | 12/1957 | Randall et al. |
| 2,857,286 A | 10/1958 | Striker |
| 2,871,134 A | 1/1959 | Loechi |
| 2,947,643 A * | 8/1960 | Kamlet ....................... 106/715 |
| 3,565,648 A | 2/1971 | Mori et al. |
| 3,615,783 A * | 10/1971 | Howard ..................... 106/711 |
| 4,662,941 A * | 5/1987 | Hagerman .................. 106/714 |
| 4,803,107 A | 2/1989 | Knowles |
| 4,954,134 A | 9/1990 | Harrison et al. |
| 5,472,917 A | 12/1995 | Talling et al. |
| 5,698,027 A | 12/1997 | Borgholm et al. |
| 6,409,820 B1 | 6/2002 | Novak |
| 6,491,751 B1 | 12/2002 | Watson |
| 6,521,039 B2 * | 2/2003 | Stroup et al. ................ 106/714 |
| 6,627,138 B2 | 9/2003 | Stroup et al. |
| 6,660,080 B2 | 12/2003 | Reddy et al. |
| 6,797,050 B2 | 9/2004 | Hoffman et al. |

OTHER PUBLICATIONS

SU 1413072 (Jul. 30, 1988) abstract only.*

* cited by examiner

*Primary Examiner*—Paul Marcantoni
(74) *Attorney, Agent, or Firm*—Buchanan Ingersoll & Rooney PC

(57) ABSTRACT

A flow enhanced calcium sulfate product includes a calcium sulfate source material, such as a flue gas desulphurization by-product, is pre-blended with a granular feedstock exhibiting good cementitious properties. The flow enhanced calcium sulfate is fed to a cement mill where it is combined with clinker during a finishing grinding process for portland cement. The flow enhanced calcium sulfate exhibits good flowability without changing the properties of the cement.

12 Claims, No Drawings

APPARATUS AND METHOD FOR FEEDING MATERIALS TO A CEMENT MILL

FIELD OF INVENTION

The present invention relates to the manufacture of hydraulic cements and in particular, portland cement.

BACKGROUND OF INVENTION

Portland cement is a type of hydraulic cement. It is made primarily from the combination of a calcareous material, such as limestone or chalk, and silica and alumina, which are found as clay or shale. These ingredients are ground to a very fine powder, mixed in predetermined proportions and then burned at high temperatures (about 1400 degrees Celsius) to form a clinker. After the formation of the clinker, and subsequent cooling, the clinker is combined with a calcium sulfate material, e.g., gypsum, to avoid flash setting of the cement. The resultant material is then ground to a particle size of between 3,000 to 5,000 $cm^2/g$ or finer.

The setting, workability, strength and other performance properties of a hydraulic cement depend in part on the relative ratios of water to cement and the percentage and chemical properties of the additives to the cement. The American Society for Testing and Materials ("ASTM") defines test procedures for determining the adequacy of hydraulic cement. For example, ASTM c688, published September 2000 and incorporated by reference herein in its entirety, provides test procedures for measuring the adequacy of portland cement when a functional additive is used, such as a setting, retarding, or accelerating additive. After formation of the clinker, the primary material additive is calcium sulfate. Additional functional additives combined with the clinker are typically less than the amount of calcium sulfate added.

A common source of calcium sulfate is gypsum. Both natural gypsum, e.g., as found in sedimentary rock, and synthetic gypsum, e.g., as an industrial waste by-product, are used in the manufacture of portland cement. In its natural state, gypsum is a relatively soft material having a Mohs hardness of 2. When processing natural gypsum during cement production, a significant amount of the gypsum becomes lost due to the difficulty in being able to feed and control fine gypsum together with more coarse gypsum. As a result, special feeders have been designed to accommodate fine and ultra fine materials. These feeders generally have a low storage capacity and require regular and routine attention.

There are also a wide variety of industrial waste by-products that are suitable sources of calcium sulfate. Flue Gas Desulphurization ("FGD") is one example. FGD is a process that transforms $SO_2$ gas into a primarily sulfur compound. A wet FGD system, and in particular, a forced oxidation wet FGD system has as a principal by-product gypsum which may be used as a source of calcium sulfate. Additional sources of calcium sulfate include any by-product waste with suitable chemistry, such as phosphate and fluoro wastes.

One major difficulty in utilizing a waste by-product is the physical size of the material. Much of the material is colloidal and will carry a high inherent moisture and thus is difficult to feed and control with conventional equipment, such as storage bins and chutes. As a result, manufacturers using waste by-products as calcium sulfate sources have had to resort to special feeding equipment to control flow.

There is a need for improving the feeding and control of calcium sulfate material during the finishing grinding process of portland cement production so as to reduce the percentage of wasted material and without requiring the use of special feeders to control the flow of gypsum.

SUMMARY

According to an embodiment of the present invention, a method for combining a calcium sulfate material with a cement clinker includes the steps of forming flow enhanced calcium sulfate by mixing the calcium sulfate material with a granular material and combining the flow enhanced calcium sulfate with the cement clinker. The flow enhanced calcium sulfate may contain a mixture of natural or synthetic gypsum and a glassy calcareous material, e.g., air quenched, cupola furnace mineral wool grit. The flow enhanced calcium sulfate may contain about 5% to 50% of the granular material by weight, which amounts may be varied according to the type of calcium sulfate source material being used. When the granular material is combined with the calcium sulfate, there is improved flowability of the calcium sulfate which can reduce costs and increase production capacity during cement production. Further, the improved flowability of the calcium sulfate can reduce reliance on special feeders or handling equipment for delivery of Calcium Sulfate to a grinding mill.

These and other aspects of the present invention will become apparent to those skilled in the art after a reading of the following description of the preferred embodiment when considered with the drawings.

DETAILED DESCRIPTION OF THE PREFERRED EMBODIMENTS

A hydraulic cement is prepared by combining cement clinker with a calcium sulfate material, e.g., natural or synthetic gypsum. According to one embodiment of the invention, the calcium sulfate material is pre-mixed with a feedstock composed primarily of a granular material having good cementitious properties. The pre-mix of calcium sulfate and the feedstock (hereinafter "Flow Enhanced Calcium Sulfate" or FECS) provides enhanced flow and feed control for the calcium sulfate when it is delivered to a cement mill and combined with cement clinker during a finishing grinding process for the cement. Moreover, it has been found that FECS provides a significant improvement in flowability with little or no changes to the properties of the cement product produced using the FECS. In some instances it has been found that the cement may exhibit a later strength increase, especially when the percentage of feedstock increases in the FECS. However, in most cases it has been found that there is little or no difference in the properties of a cement produced using a FECS verses the same cement produced without using a FECS.

The granular feedstock may include any granular material that has good cementitious properties, e.g., a glassy calcareous material. The granular feedstock can enhance the flow and feed control of calcium sulfate found as a mixture of fine and coarse material, e.g., natural gypsum, or a colloidal and high moisture content material, e.g., a waste by-product such as scrubber sludge. As a result, less material is wasted and the calcium sulfate may be effectively and reliably delivered to a cement mill using conventional chutes and conveyors.

It has been found that a glassy calcareous material works well as a granular feedstock, since this type of material will generally not cause any deleterious effects to the cement and its glassy nature tends to reduce instances of the calcium sulfate material sticking or clumping together. Other glassy, slag or cinder type material may be used. In one example, the feedstock is slag, and in particular, an air quenched, cupola furnace mineral wool grit.

The calcium sulfate may be blended with the feedstock using any suitable mixing device. The source material for the calcium sulfate may be a natural or synthetic gypsum, or a combination of the two. The gypsum is combined with the feedstock in a ratio of about 95% by weight gypsum to about 5% by weight feedstock (hereinafter, a percentage amount will be understood as a by-weight percentage amount unless stated otherwise). In other embodiments, the FECS may include from about 5% up to about 50% feedstock. For example, the FECS may contain between about 5% to 10%, 10% to 20%, 20% to 30%, 30% to 40%, 40% to 50% or 20% to 40% feedstock, with the remaining material in the FECS preferably consisting of calcium sulfate source material.

For these embodiments, the ratio of FECS to clinker in the cement mill may be chosen so that about 5% of the cement product is calcium sulfate. Thus, for example, if the FECS is composed of about 50% granular material to 50% calcium sulfate, then the amount of FECS fed to the grinding mill will be such as to achieve a ratio of about 90% clinker to about 10% FECS in the cement mill.

Tests were performed on various FECS blends to estimate the amount of improvement in flowability over calcium sulfate, i.e., the degree to which the FECS can be controlled when using a conventional conveyor or bin to transport the FECS to a cement mill. Two types of FECS were considered: a feedstock and natural gypsum, and a feedstock and synthetic gypsum. The results of these tests are tabulated in the Table. For these tests, the air quenched, cupola furnace mineral wool grit slag was used as the feedstock. About 90% of the mineral wool grit was glassy with a maximum particle size of about one inch in diameter.

TABLE

Flowability of FECS Blends vs. Base Material

| Test Cases | Slag | Natural Gypsum Fines | Synthetic Gypsum | PSI |
|---|---|---|---|---|
| Base Material | | | | |
| A | 100% | | | 6 |
| B | | 100% | | 17 |
| C | | | 100% | 100 |
| Natural Gypsum Blend | | | | |
| D | 50% | 50% | | 7 |
| E | 10% | 90% | | 11 |
| F | 5% | 95% | | 13 |
| Synthetic Gypsum Blend | | | | |
| G | 50% | | 50% | 36 |
| H | 10% | | 90% | 82 |
| I | 5% | | 95% | 100 |

Flowability was evaluated using the ASTM International Standard Test Method for Determination of Pack-Set Index of Portland Cement, designation: C 1565-04, published September 2004, the contents of which are incorporated by reference herein in its entirety. This test is typically used to determine the pack-set tendency of cement, but may also provide an indication of the flowability of an FECS blend. The test produces a Pack-Set Index ("PSI") value, which is an indication of a material's tendency to pack together after being subjected to vibration loads and thus the mechanical force needed to overcome consolidation of the material. Material having a low PSI value are considered more flowable and thereby easier to control than material having a high PSI value.

PSI values for each FECS blend are tabulated in column five. Each of these values represents the average PSI value computed over five separate tests. As a point of reference, a PSI value was also determined for 100% slag (Case A), 100% natural gypsum (Case B) and 100% synthetic gypsum (Case C). As expected, 100% synthetic gypsum has a high PSI value since this material has very poor flowability, while 100% slag flows very easily. It should be noted that tests were discontinued once the PSI value reached 100. Thus, in Case C the true PSI value is likely much higher than 100. The effect on flowability of the FECS blend when greater amounts of slag are added to natural gypsum (Cases D-F) or when greater amounts of slag are added to synthetic gypsum (Cases G-I) may be appreciated by comparing the PSI values for Cases D-F and Cases G-F to those in cases B and C, respectively. For example, when the FECS contains 50% slag to 50% natural gypsum (Case D), there is a significant improvement in flowability over Case B, as indicated by a PSI value of 7 verses 17. Similarly, an FECS composed of 50% slag and 50% synthetic gypsum has a PSI value of 36 verses over 100.

Certain modifications and improvements will occur to those skilled in the art upon a reading of the foregoing description. All modifications and improvements have been omitted herein for the sake of conciseness and readability but are properly within the scope of the present invention. It will be readily understood based on the teachings in this disclosure that other types of feedstock having good cementitious properties can produce similar improvements in flowability as those represented in the Table.

What we claim is:

1. A method for preparing hydraulic cement by combining a calcium sulfate material with a cement clinker, comprising the steps of:
    forming flow enhanced calcium sulfate by mixing the calcium sulfate material with from about 5% up to about 50% by weight of air quenched, cupola furnace mineral wool grit slag; and
    combining the flow enhanced calcium sulfate with the cement clinker prior to the finishing grinding process of Portland cement.

2. The method of claim 1, wherein the calcium sulfate material is natural gypsum.

3. The method of claim 1, wherein the calcium sulfate is colloidal synthetic gypsum that carries an inherent moisture.

4. The method of claim 1, wherein the combining step includes combining the flow enhanced calcium sulfate with the cement clinker in a cement mill so as to achieve about 5% calcium sulfate to about 95% cement clinker.

5. A method for delivery of a calcium sulfate material to a cement mill, comprising the steps of:
    forming flow enhanced calcium sulfate by mixing the calcium sulfate material with from about 5% to about 50% by weight of a glassy calcareous material, wherein the glassy calcareous material is air quenched, cupola furnace mineral wool grit slag; and
    sending the flow enhanced calcium sulfate to the cement mill.

6. The method of claim 5, wherein the forming step includes forming an enhanced calcium sulfate product having between about 10 to 40% glassy calcareous material.

7. The method of claim 5, wherein the forming step includes forming an enhanced calcium sulfate product having between about 10 to 30% glassy calcareous material.

8. The method of claim 5, wherein the forming step includes forming an enhanced calcium sulfate product having between about 10 to 20% glassy calcareous material.

9. The method of claim 5, wherein the forming step includes forming an enhanced calcium sulfate product having between about 10 to 50% glassy calcareous material.

10. The method of claim 5, wherein the calcium sulfate material is synthetic gypsum.

11. The method of claim 5, wherein the forming step includes forming an enhanced calcium sulfate product having between about 5% to 10% glassy calcareous material.

12. The method of claim 11, wherein the calcium sulfate material is natural gypsum.

* * * * *